US010798288B2

(12) United States Patent
Chou et al.

(10) Patent No.: US 10,798,288 B2
(45) Date of Patent: Oct. 6, 2020

(54) MULTI-CAMERA ELECTRONIC DEVICE AND CONTROL METHOD THEREOF

(71) Applicant: Altek Semiconductor Corp., Hsinchu (TW)

(72) Inventors: Hong-Long Chou, Hsinchu (TW); Shih-Yuan Peng, Hsinchu (TW); Hsin-Te Wang, Hsinchu (TW); Kai-Yu Tseng, Hsinchu (TW); Wen-Yan Chang, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 798 days.

(21) Appl. No.: 15/296,057

(22) Filed: Oct. 18, 2016

(65) Prior Publication Data

US 2017/0272644 A1   Sep. 21, 2017

Related U.S. Application Data

(60) Provisional application No. 62/309,966, filed on Mar. 18, 2016.

(30) Foreign Application Priority Data

Jul. 26, 2016   (TW) .............................. 105123512 A

(51) Int. Cl.
*H04N 5/232* (2006.01)
*H04N 5/235* (2006.01)
(Continued)

(52) U.S. Cl.
CPC ....... *H04N 5/23216* (2013.01); *H04N 5/2352* (2013.01); *H04N 5/23212* (2013.01); *H04N 5/247* (2013.01); *H04N 7/181* (2013.01)

(58) Field of Classification Search
None
See application file for complete search history.

(56) References Cited

U.S. PATENT DOCUMENTS

2013/0033585 A1* 2/2013 Li ........................... H04N 13/15
                                                            348/51
2014/0160245 A1* 6/2014 Cheng ................. H04N 13/296
                                                            348/47

(Continued)

FOREIGN PATENT DOCUMENTS

CN       102511013      6/2012
CN       103136747      6/2013
(Continued)

OTHER PUBLICATIONS

"Office Action of China Counterpart Application," dated Jul. 3, 2019, p. 1-p. 7.

*Primary Examiner* — James M Anderson, II
(74) *Attorney, Agent, or Firm* — JCIPRNET

(57) ABSTRACT

A multi-camera electronic device and a control method thereof are proposed. The method includes the following steps. At least one camera of the electronic device is used for scene detection to generate photographing analysis information. All the photographing analysis information is collected, and joint photographing information including a joint target is generated through a communication process among all the cameras. An individual photographing parameter of each camera is generated according to the joint photographing information. Each camera is controlled to capture an image of the scene by using its individual photographing parameter to respectively generate a corresponding output image.

8 Claims, 15 Drawing Sheets

(51) Int. Cl.
*H04N 5/247* (2006.01)
*H04N 7/18* (2006.01)

(56) References Cited

U.S. PATENT DOCUMENTS

| | | | | |
|---|---|---|---|---|
| 2016/0044257 A1* | 2/2016 | Venkataraman | ..... | H04N 5/2258 348/239 |
| 2016/0182874 A1* | 6/2016 | Richards | ................ | H04N 9/735 348/187 |

FOREIGN PATENT DOCUMENTS

| CN | 103246130 | 8/2013 |
|---|---|---|
| CN | 103873849 | 6/2014 |
| CN | 105141833 | 12/2015 |
| CN | 105376478 | 3/2016 |

* cited by examiner

MULTI-CAMERA ELECTRONIC DEVICE AND CONTROL METHOD THEREOF

CROSS-REFERENCE TO RELATED APPLICATION

This application claims the priority benefits of U.S. provisional application Ser. No. 62/309,966, filed on Mar. 18, 2016 and Taiwan application serial no. 105123512, filed on Jul. 26, 2016. The entirety of each of the above-mentioned patent applications is hereby incorporated by reference herein and made a part of this specification.

TECHNICAL FIELD

The disclosure relates to a multi-camera electronic device, in particular to, a multi-camera electronic device and a control method thereof.

BACKGROUND

With development in technology, various smart electronic devices, such as tablet computers, personal digital assistants and smart phones, have become indispensable tools for people nowadays. Camera lenses equipped in high-end smart electronic devices provide same or better specifications than those of traditional consumer cameras, and some even provide three-dimensional image capturing features or near-equivalent pixel qualities to those of digital single lens reflex cameras.

As for an electronic device equipped with dual-lens, it uses the dual-lens to obtain two images of a same scene from different view angles and performs image analysis for follow-up applications such as depth estimation, digital zooming, stereo vision, and so forth. However, some captured objects could be weakened or occluded, and photographing parameters such as optimal focus position, exposure value, white balance determined by the two lenses would be different which causes difficulties and errors in follow-up image analysis and processing.

SUMMARY OF THE DISCLOSURE

Accordingly, a multi-camera electronic device and its control method are proposed in the disclosure, where an individual photographing parameter of each camera is set based on joint photographing information generated through a communication process among the cameras to accordingly capture scene images so that the error of any follow-up image processing procedure could be minimized.

According to one of the exemplary embodiments, the control method of the electronic device includes the following steps. First, at least one camera of the electronic device is used for scene detection to generate photographing analysis information. All the photographing analysis information is collected, and joint photographing information including a joint target is generated through a communication process among all the cameras. An individual photographing parameter of each camera is generated according to the joint photographing information. Each camera is controlled to capture an image of the scene by using its individual photographing parameter to respectively generate a corresponding output image.

According to one of the exemplary embodiments, the control method of the electronic device includes the following steps. First, each of the cameras is controlled to perform an auto-focus (AF) procedure to respectively generate focus analysis information. Next, a communication process is performed among each of the cameras to integrate all the focus analysis information, and joint focus information including a joint focus target is generated. An individual focus parameter of each of the cameras by using the joint focus information is respectively generated. Each of the cameras is controlled to perform a focus procedure by using the respective individual focus parameter to generate a corresponding output image.

According to one of the exemplary embodiments, the electronic device includes multiple cameras, a processor, and an image processor. The processor is coupled to each of the cameras and includes a communication module and photographing parameter tuning modules respectively corresponding to all the cameras. At least one of the photographing parameter tuning module detects a scene by using at least one of the cameras to generate photographing analysis information. The communication module collects all the photographing analysis information and generates joint photographing information comprising a joint target through a communication process among all the cameras. Each of the photographing parameter tuning modules generates an individual photographing parameter of the corresponding camera according to the joint photographing information and controls the corresponding to capture an image of the scene by using the respective individual photographing parameter to generate a corresponding output image. The image processor is coupled to each of the cameras and receives the output images from the cameras.

According to one of the exemplary embodiments, the electronic device includes multiple cameras, a processor, and an image processor. The processor is coupled to each of the cameras and includes a communication module AF tuning modules respectively corresponding to all the cameras. Each of the AF tuning modules control the corresponding camera to perform an AF procedure to respectively generate focus analysis information. The communication module performs a communication process on each of the cameras to integrate all the focus analysis information and generates joint focus information including a joint focus target. Each of the AF tuning modules respectively generates an individual focus parameter of each of the cameras by using the joint focus information. The image processor is coupled to each of the cameras and receives the output images from the cameras.

In view of the aforementioned descriptions, in the proposed multi-camera electronic device and its control method, before the electronic device performs image capturing on a particular scene, a communication process would be performed among all the cameras to generate joint photographing information of the scene, and all the cameras would capture images of the scene according to their individual photographing parameters generated based on the joint photographing information. The error of any follow-up image processing procedure could be thus minimized, and the effectiveness of follow-up application such as depth estimation, image fusion, distance measurement, digital zooming, stereo vision would be greatly enhanced.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
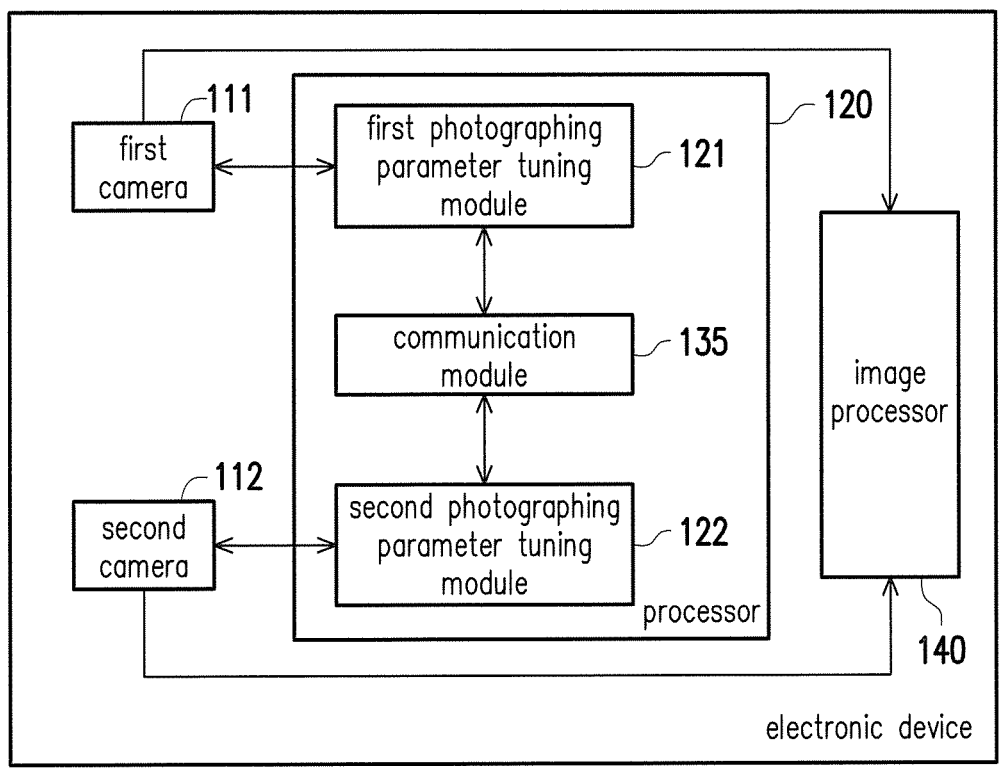
FIG. 1 illustrates a block diagram of an electronic device in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a proposed multi-camera electronic device in accordance with one of the exemplary embodiments of the disclosure. All components of the electronic device and their configurations are first introduced in FIG. 1. The functionalities of the components are disclosed in more detail in conjunction with FIG. 2. In the present exemplary embodiment, a two-camera electronic device would be illustrated.

Referring to FIG. 1, an electronic device 100 would include a first camera 111, a second camera 112, a processor 120, and an image processor 140. In the present exemplary embodiment, the electronic device 100 could be, for example, a digital camera, a digital single lens reflex camera or other devices provided with an image capturing feature such as a smart phone, a tablet computer, a personal digital assistant, and so forth. The disclosure is not limited in this regard.

Each of the first camera 111 and the second camera 112 would respectively include a camera lens and sensing elements. The camera lens would include a lens and an actuator. The actuator could be a stepping motor, a voice coil motor (VCM), a piezoelectric actuator, or other actuators able to mechanically move the lens. The disclosure is not limited in this regard. The sensing elements would be configured to sense light intensity entering the lens to thereby generate images. The sensing elements are, for example, charge-coupled-device (CCD) elements, complementary metal-oxide semiconductor (CMOS) elements. The disclosure is not limited in this regard. In the present exemplary embodiment, the camera lens of first camera 111 and the second camera 112 would be both color camera lenses, and yet the disclosure is not limited thereto.

The processor 120 would be coupled to the first camera 111 and the second camera 112. The processor 120 could be, for example, a central processing unit (CPU) or other programmable devices for general purpose or special purpose such as a microprocessor and a digital signal processor (DSP), a programmable controller, an application specific integrated circuit (ASIC), a programmable logic device (PLD), other similar devices or a combination of above-mentioned devices. The processor 120 would include a first photographing parameter tuning module 121 corresponding to the first camera 111, a second photographing parameter tuning module 122 corresponding to the second camera 112, and a communication module 135. The first photographing parameter tuning module 121, the second photographing parameter tuning module 122, and the communication module 135 could be computer programs, codes, or commands loaded to the processor 120 or could be implemented as logic circuits. The disclosure is not limited in this regard.

The image processor 140 would be coupled to the first camera 111 and the second camera 112. The image processor 140 could be a DSP, a microcontroller, a programmable controller, an ASIC, a PLD, other similar devices or a combination of above-mentioned devices. In another embodiment, the image processor 140 and the processor 120 could be integrated as a single chip or a chipset. The disclosure is not limited in this regard. The image processor 140 would be configured to process images captured by the first camera 111 and the second camera 112.

It is appreciated that one skilled in the art will understand that the electronic device 100 would further include a data storage device (not shown) coupled to the first camera 111, the second camera 112, the processor 120, and the image processor 140. The data storage device would be configured to store images and data and could be one or a combination of a stationary or mobile random access memory (RAM), a read-only memory (ROM), a flash memory, a hard drive or other similar devices.

Detailed steps of how the electronic device 100 controls the first camera 111 and the second camera 112 would be illustrated along with each component of the electronic device 100 hereafter.

Figure 2:
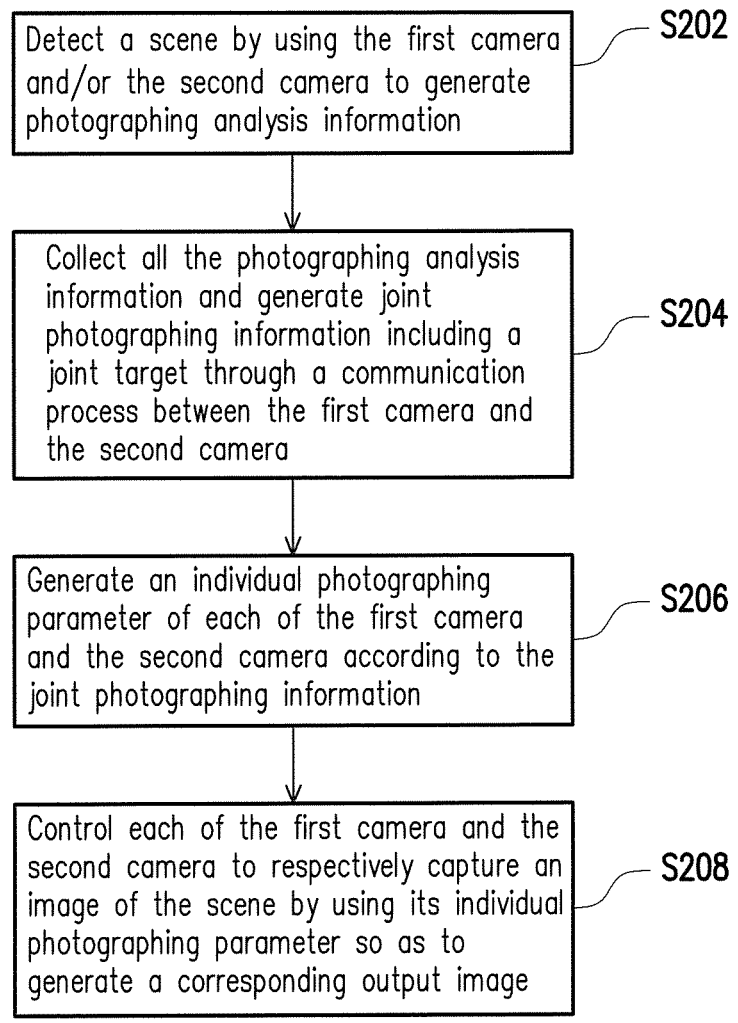
FIG. 2 illustrates a flowchart of a control method of an electronic device in accordance with one of the exemplary embodiments of the disclosure.

FIG. 2 illustrates a flowchart of a control method of an electronic device in accordance with one of the exemplary embodiments of the disclosure.

Referring to both FIG. 1 and FIG. 2, before the electronic device 100 performs image capturing on a scene, the first photographing parameter tuning module 121 would detect the scene by using the first camera 111 and/or the second photographing parameter tuning module 122 would detect the scene by using the second camera 112 to generate photographing analysis information (Step S202). The photographing analysis information could be setting values of the scene that are associated with auto-focus (AF), auto-exposure (AE), and auto-white-balance (AWB).

Next, the communication module 135 would collect all the photographing analysis information and generate joint photographing information including a joint target through a communication process (also referred to as "a cross-talk process") between the first camera 111 and the second camera 112 (Step S204). The first photographing parameter tuning module 121 and the second photographing parameter tuning module 122 would generate an individual photographing parameter of each of the first camera 111 and the second camera 112 according to the joint photographing information (Step S206) and control each of the first camera 111 and the second camera 112 to respectively capture an image of the scene by using its individual photographing parameter so as to generate a corresponding output image (Step S208). In detail, the communication module 135 of the processor 120 could be considered as a communication medium to communicate between the first camera 111 and the second camera 112 and integrate their photographing information so that the first photographing parameter tuning module 121 and the second photographing parameter module 122 could generate the individual photographing parameters of the first cameras 111 and the second camera 112 according to the integrated photographing information. The scene images would be captured thereafter, and the error of any follow-up image processing procedure performed by the image processor 140 could be minimized. The followed-up image processing procedure could be referred to as any application in depth estimation, image fusion, distance measurement, digital zooming, stereo vision as known by persons skilled in the art or the combination thereof based on the output images.

The proposed control method could be categorized into a master-slave architecture and a joint-decision architecture. Detailed descriptions are given in the following embodiments.

Figure 3:
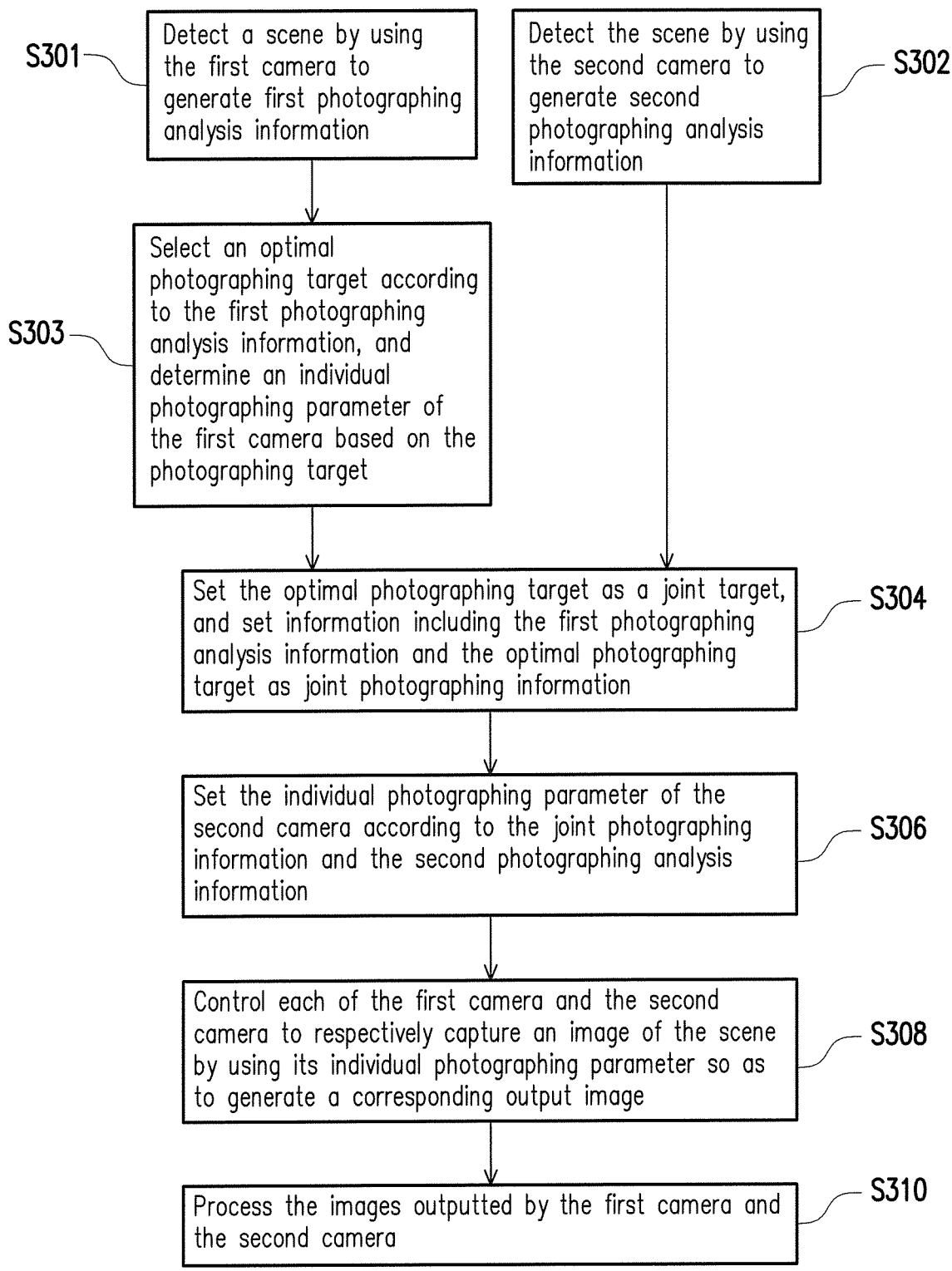
FIG. 3 illustrates a flowchart of a control method of an electronic device in accordance with one of the exemplary embodiments of the disclosure.

FIG. 3 illustrates a flowchart of a control method of an electronic device in accordance with one of the exemplary embodiments of the disclosure based on the master-slave architecture. In the present exemplary embodiment, assume that the first camera 111 is a master camera, and the second camera 112 is a slave camera.

Referring to both FIG. 1 and FIG. 3, before the electronic device 100 performs image capturing on a scene, the first photographing parameter tuning module 121 would detect the scene by using the first camera 111 to generate first photographing analysis information (Step S301), and the second photographing parameter tuning module 122 would also detect the scene by using the second camera 112 to generate second photographing analysis information (Step S302). Herein, the first photographing parameter tuning module 121 could perform analysis on signals outputted by the first camera 111 by leveraging any control algorithm to obtain the first photographing analysis information of the first camera 111, select an optimal photographing target according to the first photographing analysis information, and determine an individual photographing parameter of the first camera 111 based on the photographing target (Step S303). On the other hand, the second photographing parameter tuning module 122 could perform analysis on signals outputted by the second camera 112 by leveraging any control algorithm as well to obtain the second photographing analysis information of the first camera 112, and yet the second photographing parameter tuning module 122 would not determine its individual photographing parameter at this point.

Next, the first photographing parameter tuning module 121 would transmit the first photographing analysis information and the optimal photographing target to the communication module 135. The communication module 135 would set the optimal photographing target as a joint target and further set information including the first photographing analysis information and the optimal photographing target as joint photographing information (Step S304). For example, when the photographing parameter is an AF value, an AE value, or an AWB value, the first photographing parameter tuning module 121 could obtain focus analysis information, exposure analysis information, or white balance analysis information of the scene by leveraging a 3A algorithm and set them as the first photographing analysis information.

Next, the communication module 135 would assist the second camera 112 to determine its individual photographing parameter based on the joint photographing information and the second photographing analysis information of the second photographing parameter tuning module 122. In detail, the second photographing parameter tuning module 122 would transmit the second photographing analysis information to the communication module 135, and the communication module 135 would set the individual photographing parameter of the second camera 112 by referencing the joint photographing information (i.e. the joint target and the first photographing analysis information) as well as the second photographing analysis information (Step S306). Herein, the communication module 135 would determine and transmit the individual photographing parameter of the second camera 112 back to the second photographing parameter tuning module 122. Yet in another embodiment, the communication module 135 would transmit the joint photographing information to the second photographing parameter tuning module 122, and the second photographing parameter tuning module 122 would set the individual photographing parameter of the second camera 112 by referencing the joint photographing information (i.e. the joint target and the first photographing analysis information) as well as the second photographing analysis information.

It should be noted that, the individual photographing parameter of the second camera 112 would not be necessarily the same as that of the first camera 111. Instead, the individual photographing parameter of the second camera 112 would be determined by using the first photographing analysis information as auxiliary information so that images captured by the first camera 111 and the second camera 112 later on would have same image characteristics. For example, these images could have a same focused target, a joint target with a same exposure level or a same white balance effect to allow the image processor 140 to smoothly perform image processing in follow-up stages.

Next, the first photographing parameter tuning module 121 and the second photographing parameter tuning module 122 would control each of the first camera 111 and the second camera 112 to respectively capture an image of the scene by using its individual photographing parameter so as to generate a corresponding output image (Step S308), and the image processor 140 would process the images outputted by the first camera 111 and the second camera 112 (Step S310).

Figure 4:
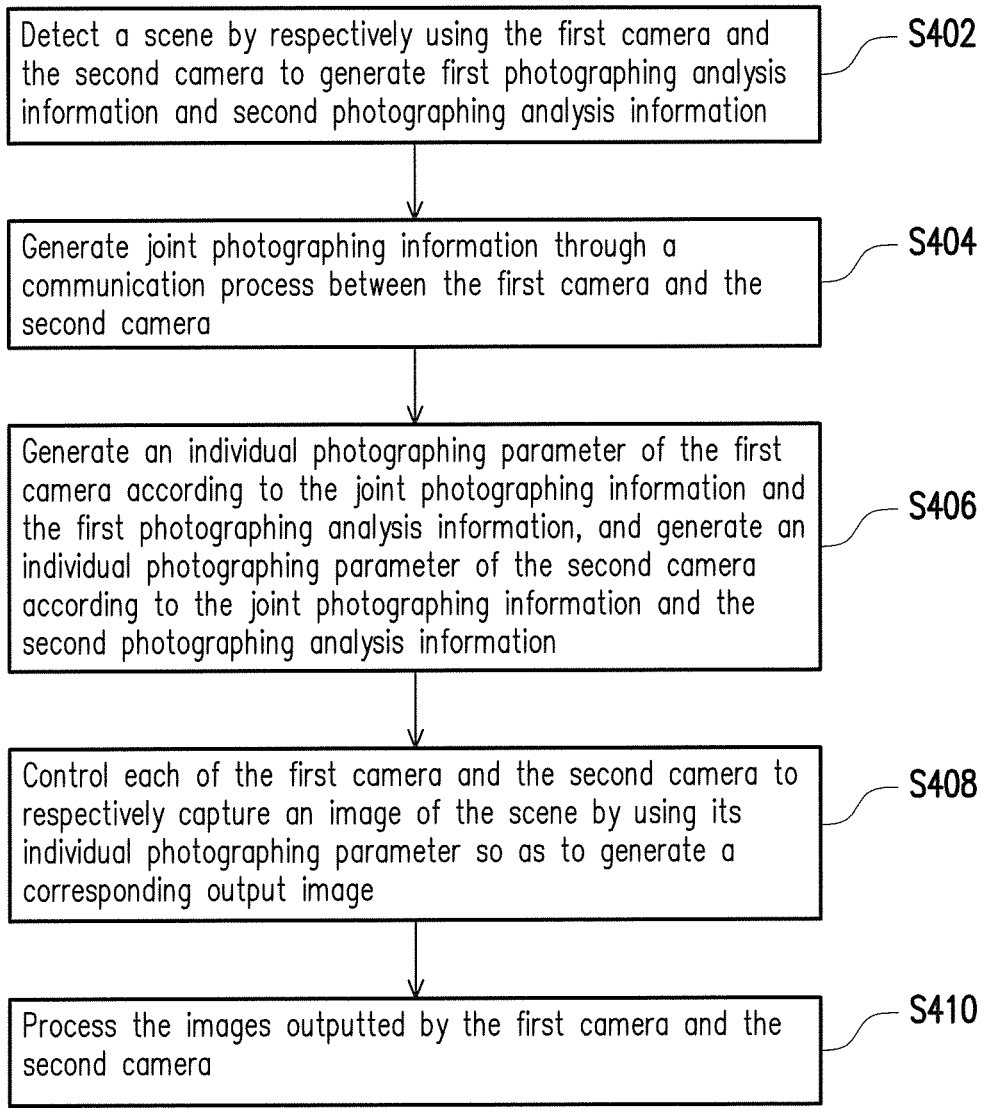
FIG. 4 illustrates a flowchart of a control method of an electronic device in accordance with one of the exemplary embodiments of the disclosure.

FIG. 4 illustrates a flowchart of a control method of an electronic device in accordance with one of the exemplary embodiments of the disclosure based on the joint-decision architecture.

Referring to both FIG. 1 and FIG. 4, the first photographing parameter tuning module 121 and the second photographing parameter tuning module 122 would detect the scene by respectively using the first camera 111 and the second camera 112 to generate first photographing analysis information and second photographing analysis information (Step S402). Herein, the first photographing parameter tuning module 121 and the second photographing parameter tuning module 122 could perform analysis on signals outputted by the first camera 111 and the second camera 112 by leveraging any control algorithm to obtain the first photographing analysis information and the second photographing analysis information. For example, when the photographing parameter is an AF value, an AE value, or an AWB value, the first photographing parameter tuning module 121 and the second photographing parameter tuning module 112 could obtain focus analysis information, exposure analysis information, or white balance analysis information of the scene by leveraging a 3A algorithm to be set as the first photographing analysis information.

Next, the first photographing parameter tuning module 121 and the second photographing parameter tuning module 122 would respectively transmit the first photographing analysis information and the second photographing analysis information to the communication module 135 to generate joint photographing information including a joint target object through a communication process (Step S404). Distinguished from the master-slave architecture where the joint photographing information including the joint target is generated according to the optimal photographing target of a single camera (i.e. the master camera) and the first photographing analysis information, the joint photographing information in the joint-decision architecture is generated based on both the photographing analysis information of the first camera 111 and the second camera 112.

Next, the communication module 135 would generate an individual photographing parameter of the first camera 111 according to the joint photographing information and the first photographing analysis information and generate an individual photographing parameter of the second camera 112 according to the joint photographing information and the second photographing analysis information (Step S406) so that images captured by the first camera 111 and the second camera 112 later on would have same image characteristics to allow the image processor 140 to smoothly perform any follow-up image processing. Similarly, the first photographing parameter tuning module 121 and the second photographing parameter tuning module 122 would control each of the first camera 111 and the second camera 112 to respectively capture an image of the scene by using its individual photographing parameter so as to generate a corresponding output image (Step S408), and the image processor 140 would process the images outputted by the first camera 111 and the second camera 112 (Step S410). In other embodiments, the communication module 135 would transmit the joint photographing information to the first photographing parameter tuning module 121 and the second photographing parameter tuning module 122. The first photographing parameter tuning module 121 would set the individual photographing parameter of the first camera 111 by referencing the joint photographing information as well as the first photographing information, and the second photographing parameter tuning module 122 would set the individual photographing parameter of the second camera 112 by referencing the joint photographing information as well as the second photographing analysis information.

The exemplary embodiments of FIG. 1-FIG. 4 could be extended to an electronic device having three or more cameras. In detail, FIG. 5 illustrates a block diagram of an electronic device in accordance with one of the exemplary embodiments of the disclosure.

Figure 5:
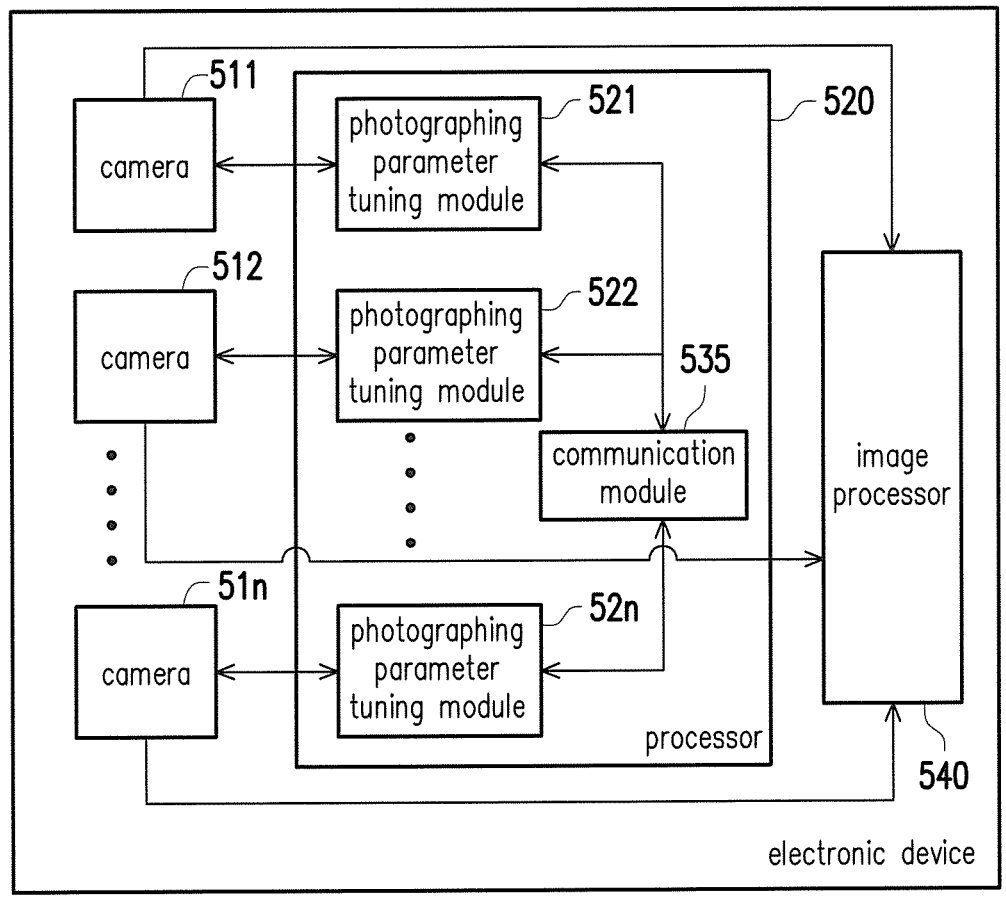
FIG. 5 illustrates a block diagram of an electronic device in accordance with one of the exemplary embodiments of the disclosure.

Referring to FIG. 5, an electronic device 500 would include cameras 511-51$n$, a processor 520, and an image processor 540 that are respectively similar to the first cameras 111 and the second cameras 112, the processor 120, and the image processor 140 in FIG. 1. For the sake of brevity, the similarities would not be repeated. In the present exemplary embodiment, the processor 520 would be configured to control the operation of each component of the electronic device 500 and include photographing parameter tuning module 521-52$n$ corresponding to the cameras 511-51$n$ and a communication module 535. In the master-slave architecture, one of the cameras 511-51$n$ would be set as a master camera, and the others would be set as slave cameras. Thus, the communication module 535 would set joint photographing information based on photographing analysis information of the master camera. In the joint-decision architecture, the communication module 535 would set joint photographing information based on all photographing analysis information of the cameras 511-51$n$. The control method of the electronic device 500 could be deduced by persons skilled in the art according to the related descriptions of FIG. 2-FIG. 4 and thus would not be repeated.

Figure 6:
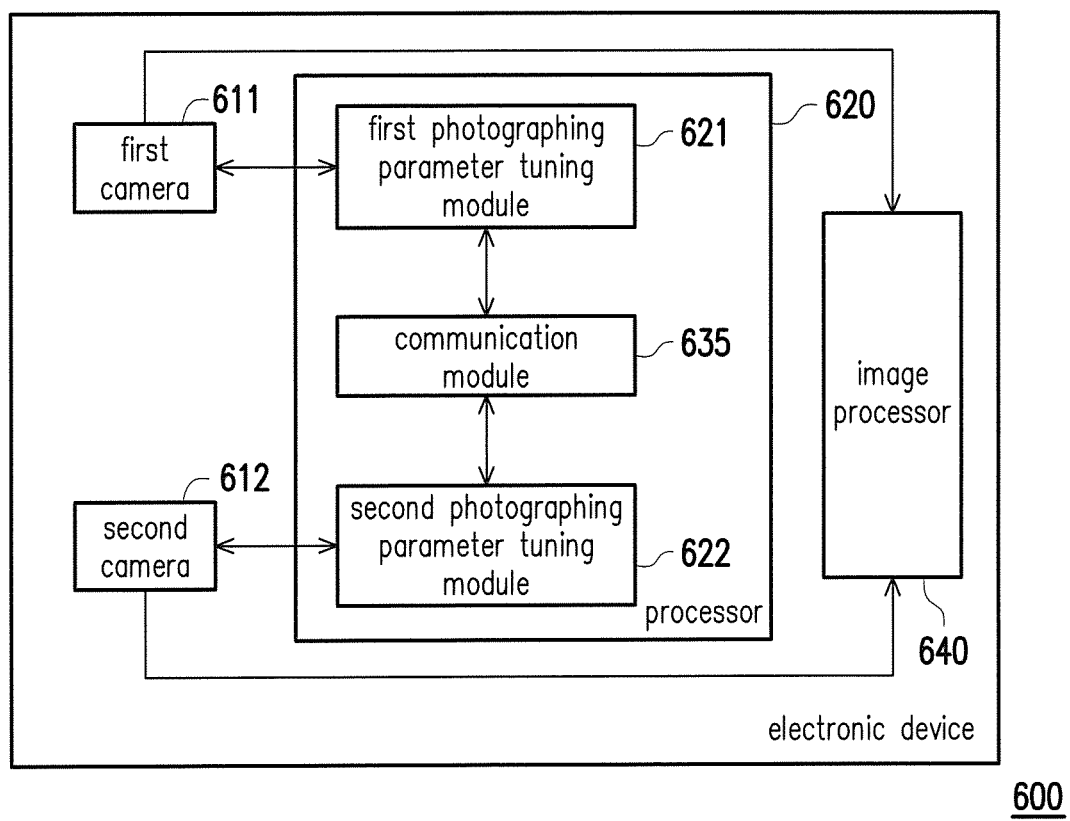
FIG. 6 illustrates a block diagram of an electronic device in accordance with one of the exemplary embodiments of the disclosure.

FIG. 6 illustrates a block diagram of an electronic device in accordance with one of the exemplary embodiments of the disclosure.

Referring to FIG. 6, an electronic device 600 would include a first camera 611, a second camera 612, a processor 620, and an image processor 640 that are respectively similar to the first cameras 111 and the second cameras 112, the processor 120, and the image processor 140 in FIG. 1. For the sake of brevity, the similarities would not be repeated. In the present exemplary embodiment, the processor 620 would be configured to control the operation of each component of the electronic device 600 and include a first AF tuning module 621 corresponding to the first camera 611, a second AF tuning module 622 corresponding to the second camera 612, and a communication module 635.

Figure 7A:
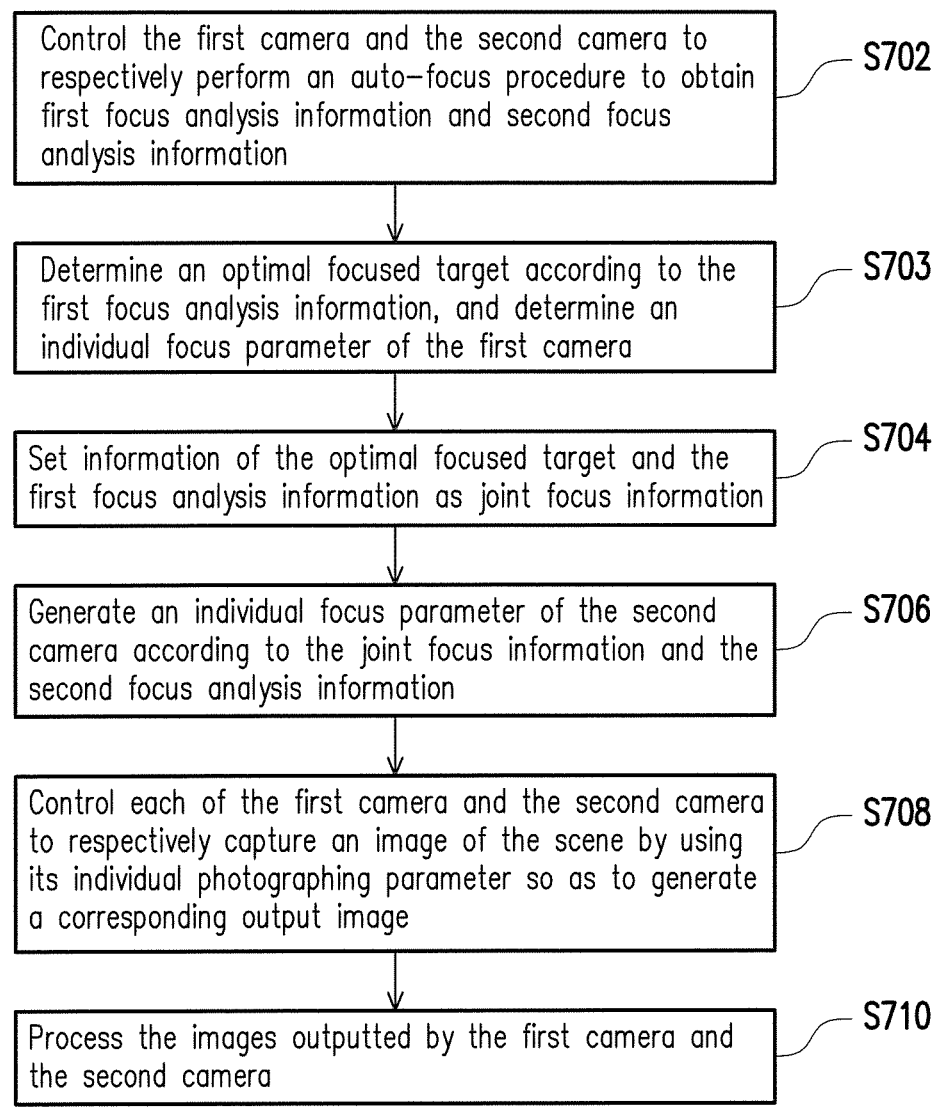
FIG. 7A illustrates a flowchart of a control method of an electronic device in accordance with one of the exemplary embodiments of the disclosure.

FIG. 7A illustrates a flowchart of a control method of an electronic device in accordance with one of the exemplary embodiments of the disclosure based on the master-slave architecture. The process flow is to perform focus control on the first camera 611 and the second camera 612 of the electronic device 600. In the present exemplary embodiment, assume that the first camera 611 is a master camera, and the second camera 612 is a slave camera.

Referring to both FIG. 6 and FIG. 7A, before the electronic device 600 performs image capturing on a scene, the first AF tuning module 621 and the second AF tuning module 622 would detect the scene by respectively using the first camera 611 and the second camera 612 to generate first focus analysis information and the second focus analysis information (Step S702). Herein, the first AF tuning module 621 and the second AF tuning module 622 could obtain the focus analysis information of the first camera 611 and the second camera 612 by leveraging any AF mechanism. For example, the first AF tuning module 621 and the second AF tuning module 622 could search for focus positions by moving the lenses of the first camera 611 and the second camera 622 through the actuators by leveraging any contrast-based AF mechanism such as hill-climbing and set a relationship curve of focus values against focus positions, focus distance and/or mechanisms to determine peaks of the two cameras respectively as the first focus analysis information and the second focus analysis information. The first AF tuning module 621 would determine an optimal focused target according to the first focus analysis information and determine its individual focus parameter, such as VCM steps, accordingly (Step S703).

Next, the communication module 635 would perform a communication process between the first camera 611 and the second camera 612. Such communication process would include setting information of the optimal focused target and the first focus analysis information as joint focus information by the first AF tuning module 621 and transmitting the joint focus information to the communication module 635 (Step S704) and/or setting information of the optimal focused target and the second focus analysis information as joint focus information by the second AF tuning module 622 and transmitting the joint focus information to the communication module 635. Next, the communication module 635 would generate an individual focus parameter of the second camera 612 according to the joint focus information and the second focus analysis information (Step S706). In detail, assume that the first focus analysis information is a focus position with a maximal focus value obtained by the first camera 611 (referred to as "a first focus position" hereafter), which would be considered as the joint focus information and the individual focus parameter of the first camera 611 in the master-slave architecture. On the other hand, assume that the second focus analysis information is at least one focus position with a local maximal focus value obtained by the second camera 612 (referred to as "a second focus position" hereafter). In the master-slave architecture, the second focus parameter adjusting module 622 would select the second focus position within a local region of the first focus position and set it as the individual focus parameter of the second camera 612.

Moreover, in another exemplary embodiment, assume that the first AF tuning module 621 has already obtained the first focus position, and the communication module 635 has already generated and transmitted joint focus information associated with a joint focused region to the second AF tuning module 622. Meanwhile, the second focus parameter adjusting module 622 could directly control the lens of the second camera 612 to search for a focus position with a local maximal focus value within a local region of the first focus position and set it as the individual focus parameter of the second camera 612.

Next, the first photographing parameter tuning module 621 and the second photographing parameter tuning module 622 would control each of the first camera 611 and the second camera 612 to respectively capture an image of the scene by using its individual photographing parameter so as to generate a corresponding output image (Step S708), and the image processor 640 would process the images outputted by the first camera 611 and the second camera 612 (Step S710). That is, the first AF tuning module 621 and the second AF tuning module 622 would respectively control the lenses of the first camera 611 and the second camera 612 to move to the focus positions which satisfy their individual focus parameters. Hence, the images captured by the first camera 611 and the second camera 612 later on would share a joint focused region to allow the image processor 140 to smoothly perform any follow-up image processing.

Figure 7B:
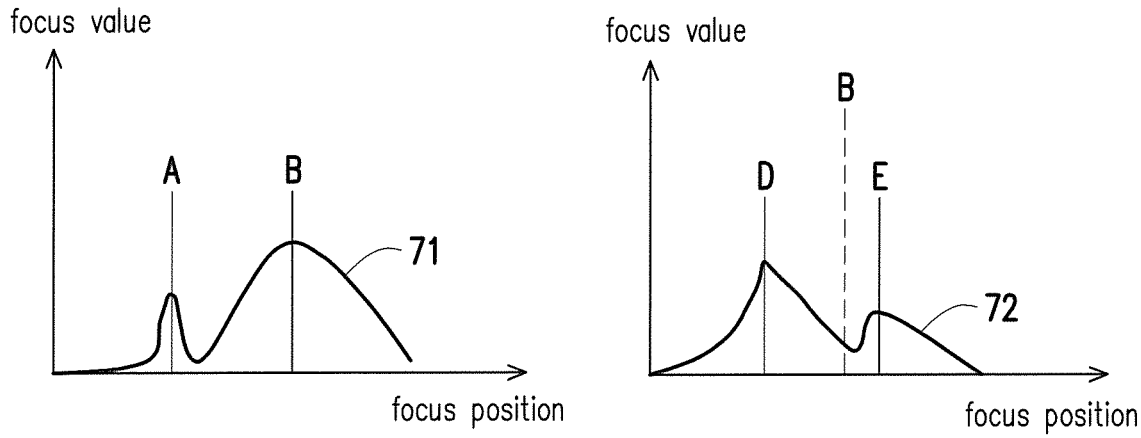
FIG. 7B illustrates schematic diagrams of setting first focus analysis information and second focus analysis information in accordance with one of the exemplary embodiments of the disclosure.

To be specific, FIG. 7B illustrates schematic diagrams of setting first focus analysis information and second focus analysis information in accordance with one of the exemplary embodiments of the disclosure.

Figure 7C:
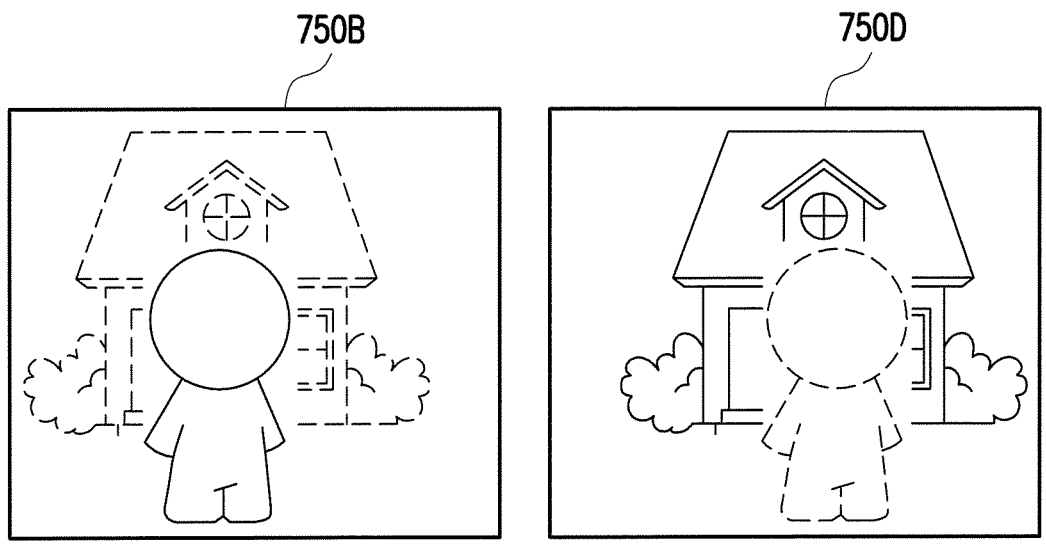
FIG. 7C illustrates schematic diagrams of output images in accordance with a conventional AF method.

Referring to FIG. 7B, assume that a curve 71 and a curve 72 are relationship curves of focus values against focus positions obtained from the first AF tuning module 621 and the second AF tuning module 622 which respectively control the first camera 611 and the second camera 612 to perform hill-climbing on the scene. As for a conventional AF mechanism, the first camera 611 would focus on a photographing plane corresponding to a point B (i.e. a foreground of the scene, where the solid line represents a focused region, and the dash line represents an unfocused region), and the second camera 612 would focus on a photographing plane corresponding to a point D (i.e. a background of the scene). Hence, the two cameras would capture two images focus on different photographing planes such as an output image 750B and an output image 750D as illustrated in FIG. 7C in accordance with the conventional AF method.

Figure 7D:
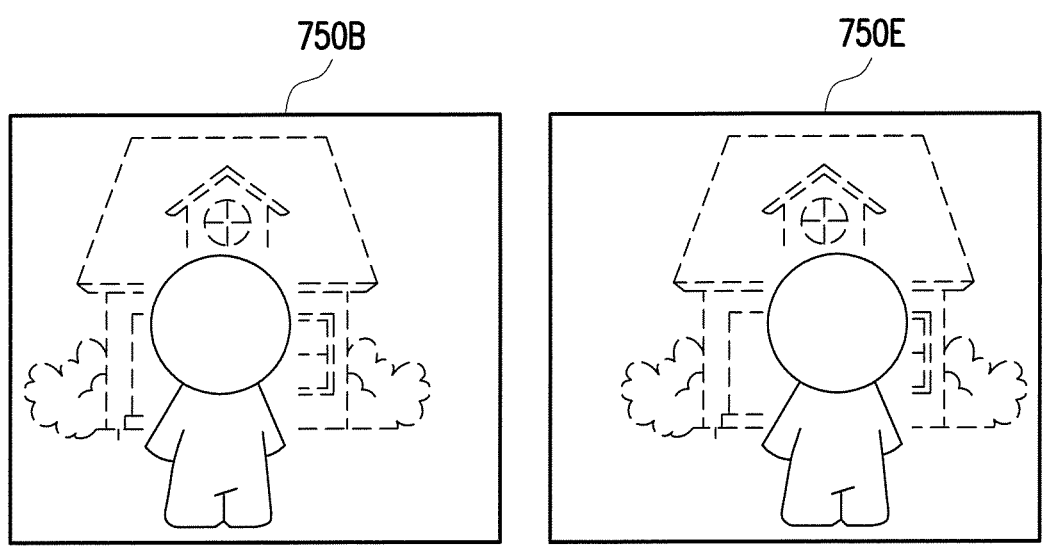
FIG. 7D illustrates schematic diagrams of output images in accordance with one of the exemplary embodiments of the disclosure.

However, as for the focus control mechanism proposed in FIG. 7A, after the first AF tuning module 621 obtains the point B with a maximal focus value, the communication module 635 would set the point B as joint focus information, and the second AF tuning module 632 would control the lens of the second camera 612 to move to a point E which is close to the point B and with a local maximal focus value. Hence, even the focus value corresponding to the point E is not a global maximal focus value of the second camera 612, it has the same foreground of the scene as the point B and corresponds to a local maximal focus value. The focus control mechanism proposed in FIG. 7A would ensure that the two images captured by the first camera 611 and the second camera 612 would focus on the same photographing plane such as an output image 750B and an output image 750E as illustrated in FIG. 7D in accordance with one of the exemplary embodiments of the disclosure.

Figure 8A:
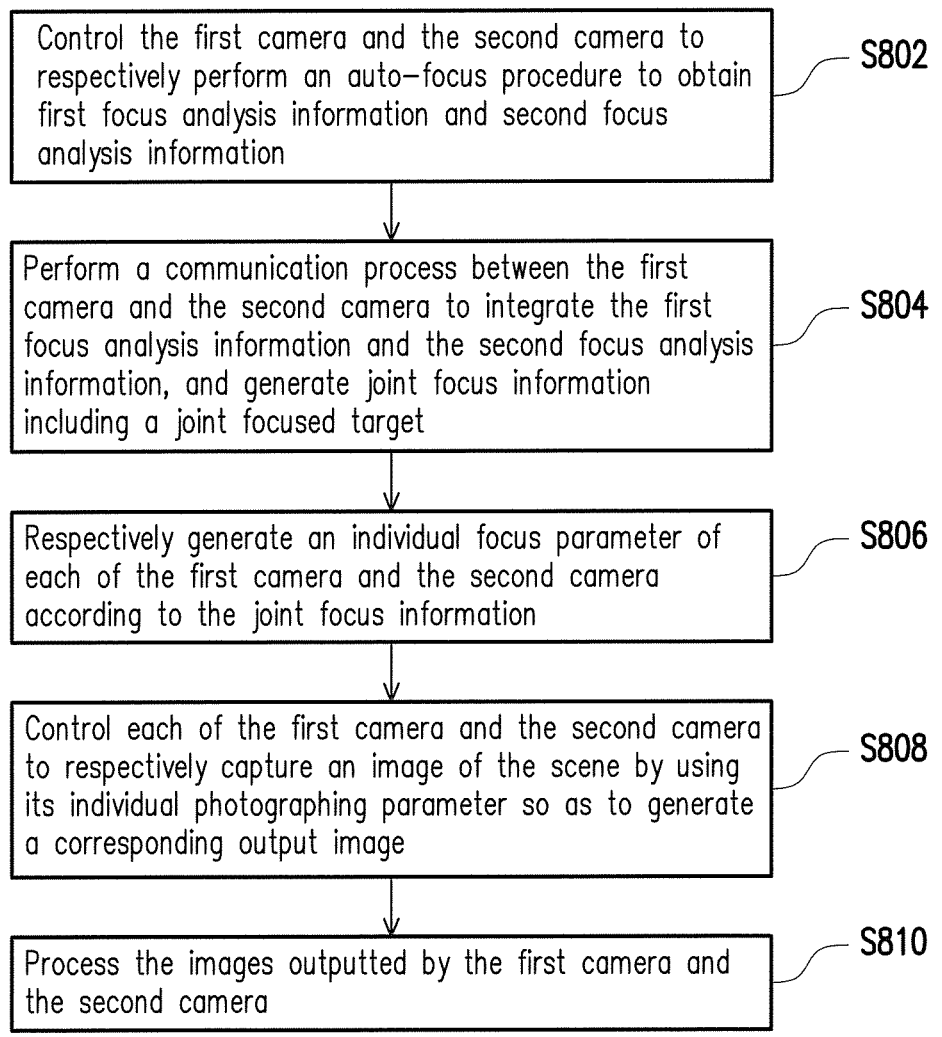
FIG. 8A illustrates a flowchart of a control method of an electronic device in accordance with one of the exemplary embodiments of the disclosure.

FIG. 8A illustrates a flowchart of a control method of an electronic device in accordance with one of the exemplary embodiments of the disclosure based on the joint-decision architecture. The process flow is to perform focus control on the first camera 611 and the second camera 612 of the electronic device 600.

Referring to FIG. 6 and FIG. 8A, before the electronic device 600 performs image capturing on a scene, the first AF tuning module 621 and the second AF tuning module 622 would detect the scene by respectively using the first camera 611 and the second camera 612 to generate first focus analysis information and the second focus analysis information (Step S802). Herein, the first AF tuning module 621 and the second AF tuning module 622 could obtain the focus analysis information of the first camera 611 and the second camera 612 by leveraging any AF mechanism. Details could refer to the related descriptions of the previous embodiments and thus would not be repeated.

Next, the communication module 635 would perform a communication process between the first camera 611 and the second camera 612 to integrate the first focus analysis information and the second focus analysis information and generate joint focus information including a joint focused target (Step S804). Next, the first AF tuning module 621 and the second AF tuning module 622 would respectively generate an individual focus parameter of each of the first camera 611 and the second camera 612 according to the joint focus information (Step S806). In detail, assume that the focus analysis information obtained by the first AF tuning module 621 by using the first camera 611 includes local focus positions with local maximal focus values (referred to as "first focus positions" hereafter), and the focus analysis information obtained by the second AF tuning module 622 by using the first camera 612 includes local focus positions with local maximal focus values (referred to as "second focus positions" hereafter). The communication module 635 would respectively select the first local focus position and the second local focus position which are both within the joint focused region and set them as the individual focus parameter of the first camera 611 and the second camera 612 respectively.

In an exemplary embodiment, since a main subject of an image is normally in a foreground, the communication module 635 could set a foreground region as the joint focused region. In another embodiment, the communication module 635 could provide the user to select the joint focused region through a user interface (not shown).

Next, the first photographing parameter tuning module 621 and the second photographing parameter tuning module 622 would control each of the first camera 611 and the second camera 612 to respectively capture an image of the scene by using its individual photographing parameter so as to generate a corresponding output image (Step S808), and thus the images captured by the first camera 611 and the second camera 612 would have the joint focused region. The image processor 640 would next process the images outputted by the first camera 611 and the second camera 612 (Step S810).

Figure 8B:
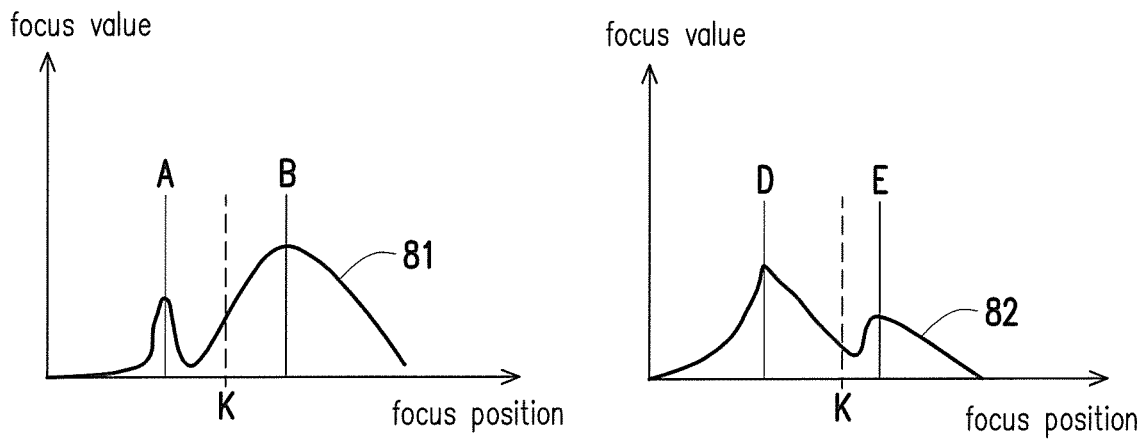
FIG. 8B illustrates schematic diagrams of setting first focus analysis information and second focus analysis information in accordance with one of the exemplary embodiments of the disclosure.

To be specific, FIG. 8B illustrates schematic diagrams of setting first focus analysis information and second focus analysis information in accordance with one of the exemplary embodiments of the disclosure.

Referring to FIG. 8B, assume that that a curve 81 and a curve 82 are relationship curves of focus values against focus positions obtained from the first AF tuning module 621 and the second AF tuning module 622 which respectively control the first camera 611 and the second camera 612 to perform hill-climbing on the scene. Herein, a point A and a point B are local focus positions of the first camera 611 with local maximal focus values, and a point D and a point E are local focus positions of the second camera 612 with local maximal focus values. As for the focus control mechanism proposed in FIG. 8A, assume that the communication module 635 would set the focus positions corresponding to the focus values greater than K (i.e. a foreground range) as a joint focused region. The first AF tuning module 631 and the second AF tuning module 632 would respectively control the lens of the first camera 611 and the second camera 612 to move to the point B and the point E which are both within the joint focus region, and thus the focus control mechanism proposed in FIG. 8A would ensure that the two images captured by the first camera 611 and the second camera 612 focus on the same photographing plane.

The exemplary embodiments of FIG. 6-FIG. 8 could be extended to an electronic device having three or more cameras. In detail, FIG. 9 illustrates a block diagram of an electronic device in accordance with one of the exemplary embodiments of the disclosure.

Figure 9:
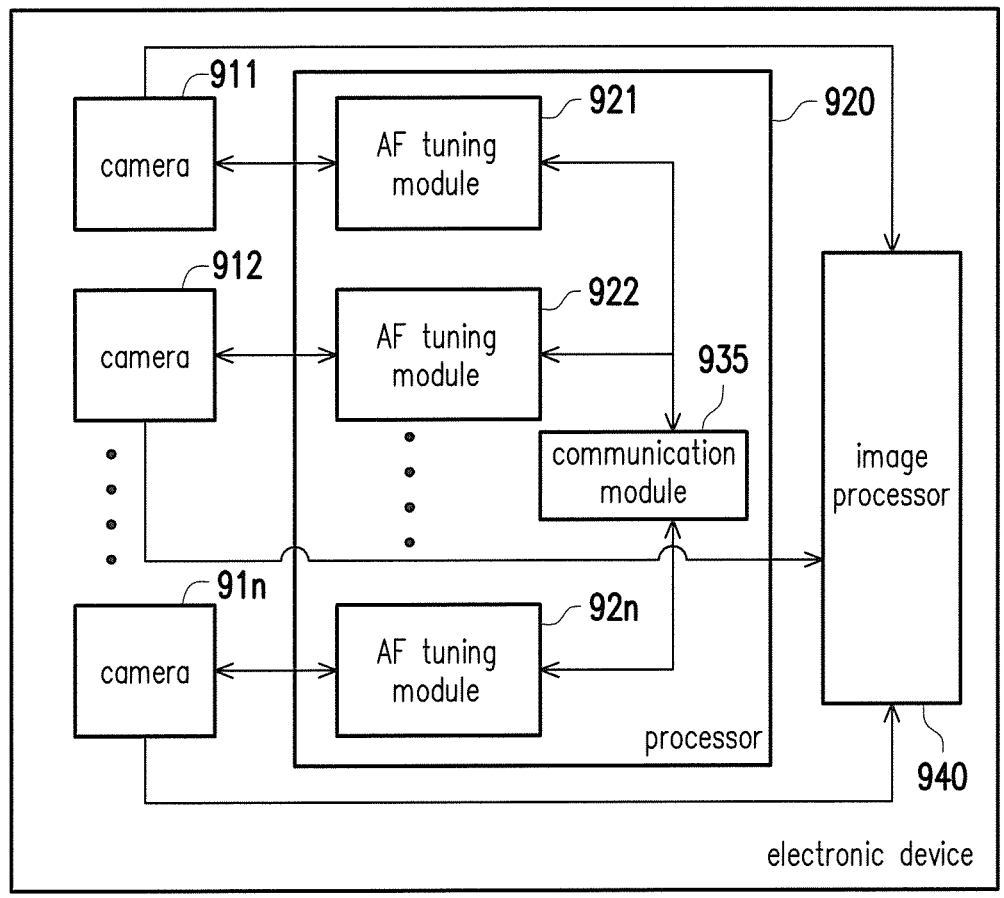
FIG. 9 illustrates a block diagram of an electronic device in accordance with one of the exemplary embodiments of the disclosure.

Referring to FIG. 9, an electronic device 900 would include cameras 911-91$n$, a processor 920, and an image processor 940 that are respectively similar to the first cameras 611 and the second cameras 612, the processor 620, and the image processor 640 in FIG. 1. For the sake of brevity, the similarities would not be repeated. In the present exemplary embodiment, the processor 920 would be configured to control the operation of each component of the electronic device 900 and include photographing parameter tuning module 921-92$n$ corresponding to the cameras 911-91$n$ and a communication module 935. In the master-slave architecture, one of the cameras 911-91$n$ would be set as a master camera, and the others would be set as slave cameras. Thus, the communication module 935 would set joint focus information based on focus analysis information of the master camera. In the joint-decision architecture, the communication module 935 would set joint focus information based on all focus analysis information of the cameras 911-91$n$. The control method of the electronic device 900 could be deduced by persons skilled in the art according to the related descriptions of FIG. 6-FIG. 8 and thus would not be repeated.

Figure 10:
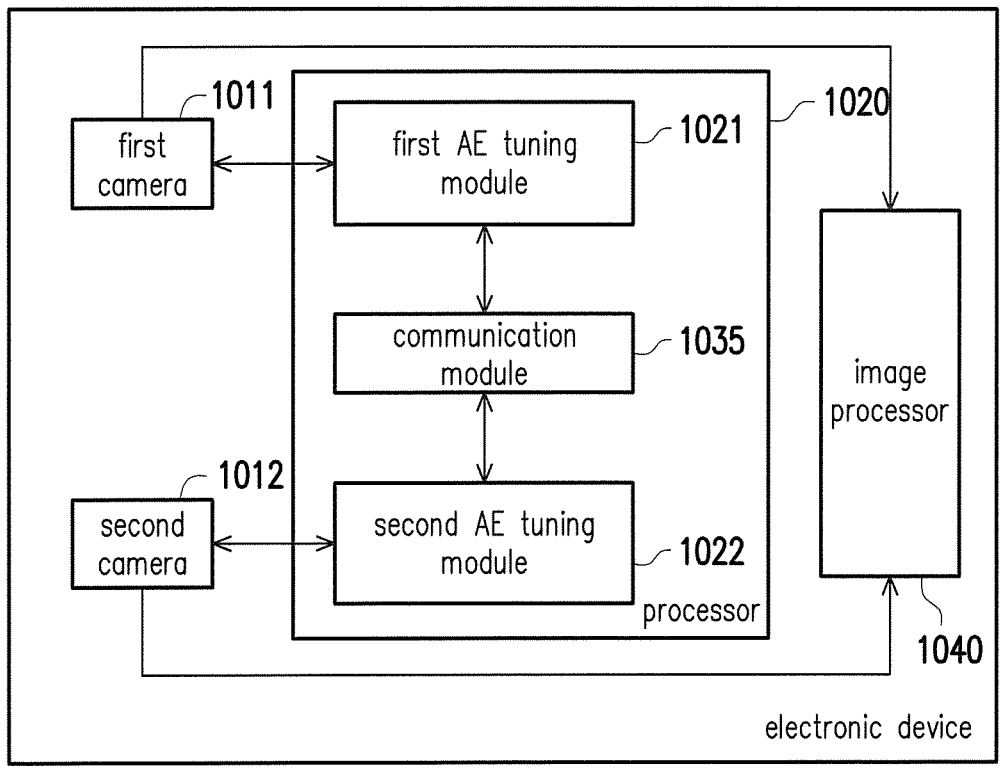
FIG. 10 illustrates a block diagram of an electronic device in accordance with one of the exemplary embodiments of the disclosure.

FIG. 10 illustrates a block diagram of an electronic device in accordance with one of the exemplary embodiments of the disclosure.

Referring to FIG. 10, an electronic device 1000 would include a first camera 1011, a second camera 1012, a processor 1020, and an image processor 1040 that are respectively similar to the first cameras 611 and the second cameras 612, the processor 620, and the image processor 640 in FIG. 6. For the sake of brevity, the similarities would not be repeated. In the present exemplary embodiment, the processor 1020 would be configured to control the operation of each component of the electronic device 1000 and include a first AE tuning module 1021 corresponding to the first camera 1011, a second AE tuning module 1022 corresponding to the second camera 1012, and a communication module 1035.

Figure 11:
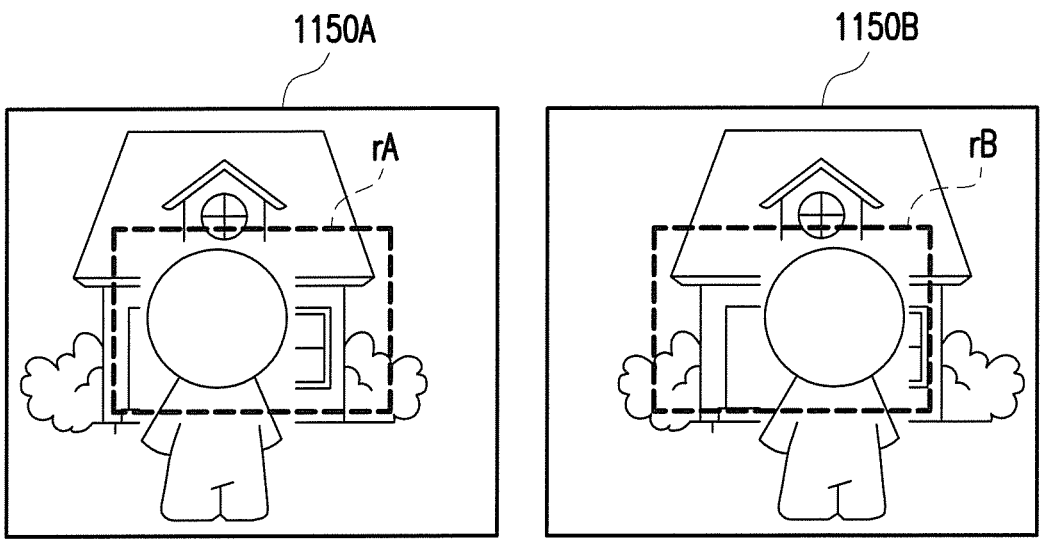
FIG. 11 illustrates schematic diagrams of setting first exposure analysis information and second exposure analysis information in accordance with one of the exemplary embodiments of the disclosure.

FIG. 11 illustrates schematic diagrams of setting first exposure analysis information and second exposure analysis information in accordance with one of the exemplary embodiments of the disclosure based on the master-slave architecture as well as the joint decision architecture. The process flow is to perform exposure control on the first camera 1011 and the second camera 1012 of the electronic device 1000.

Referring to both FIG. 10 and FIG. 11, assume that an image frame 1150A and an image frame 1150B are respectively image frames of a scene captured by the first camera 1011 and the second camera 1012. As for a conventional AE mechanism, a central region rA of the image frame 1150A and a central region rB of the image frame 1150B would be targeted, and both exposure analysis information would be calculated. However, due to different view angles of the first camera 1011 and the second camera 1012, the central region rA of the image frame 1150A and the central region rB of the image frame 1150B would have different scenes and illuminance signals which would result in different exposure levels.

In the proposed exposure mechanism based on the master-slave architecture, the first AE tuning module 1021 would obtain exposure analysis information of the scene of the first camera 1011 by leveraging any AE mechanism and set it as first exposure analysis information. Herein, the first exposure analysis information includes an exposure time and a luminance gain value (referred to as "a first exposure time" and "a first luminance gain value" hereafter) which are also set the individual photographing parameter of the first camera 1011. The communication module 1035 would set the first exposure analysis information as joint exposure information and transmit it to the second AE tuning module 1022, and the second AE tuning module 1022 would adjust an exposure time and a luminance gain value of the second camera 1012 (referred to as "second exposure information" which includes "a second exposure time" and "a second luminance gain value") according to the joint exposure information.

In detail, to ensure that the first camera 1011 and the second camera 1012 are able to capture images with same luminance and color, the second AE tuning module 1022 would determine the second exposure time of the second camera 1012 by referencing a pre-stored calibration parameter and the first exposure time, and the step includes to adjust the second exposure time to be the same as the first exposure time. Moreover, since there might exist differences in luminous sensitivity between the first camera 1011 and the second camera 1012, the second AE tuning module 1022 would generate the second luminance gain value according to a pre-stored luminance gain ratio between the first camera 1011 and the second camera 1012 as well as the first luminance gain value. Thereafter, the second AE tuning module 1022 would set the second exposure time and the second luminance gain value as the individual photographing parameter of the second camera 1012. Accordingly, the images captured by the first camera 1011 and the second camera 1012 would have a same exposure level. It should be noted that, before the first camera 1011 and the second camera 1012 are assembled into the electronic device 1000, both could be positioned in front of same light source. Then, the luminance gain ratio could be calculated based on image luminance values captured by the first camera 1011 and the second camera 1012 with the same exposure time and could be pre-stored in the data storage device. In the present exemplary embodiment, the individual exposure parameter of the second camera 1012 would be determined by the second AE tuning module 1022 according to the joint exposure information and the pre-stored calibration or the luminance gain ratio. Yet in another exemplary embodiment, the individual exposure parameter of the second camera 1012 could also be determined by the communication module 1035 according to the joint exposure information and the pre-stored calibration parameter or the luminance gain ratio and then transmitted to the second camera 1012.

In the proposed exposure mechanism based on the joint-decision architecture, to ensure that the first camera 1011 and the second camera 1012 are able to capture images with same objects, the communication module 1035 would determine a joint exposure time according to exposure times of the first camera 1011 and the second camera 1012 so that their exposure times could be adjusted to the same. Moreover, since there might exist differences in luminous sensitivity between the first camera 1011 and the second camera 1012, the first AE tuning module 1021 and the second AE tuning module 1022 would adjust their own luminance gain values according to a luminance gain ratio between the first camera 1011 and the second camera 1012. The first AE tuning module 1021 and the second AE tuning module 1022 would set the individual exposure parameters of the first camera 1011 and the second camera 1012 according to the exposure times and the luminance gain values before and after the adjustment so that the images captured by the first camera 1011 and the second camera 1012 would have a same exposure level.

The exemplary embodiments of FIG. 10-FIG. 11 could be extended to an electronic device having three or more cameras. In detail, FIG. 12 illustrates a block diagram of an electronic device in accordance with one of the exemplary embodiments of the disclosure.

Figure 12:
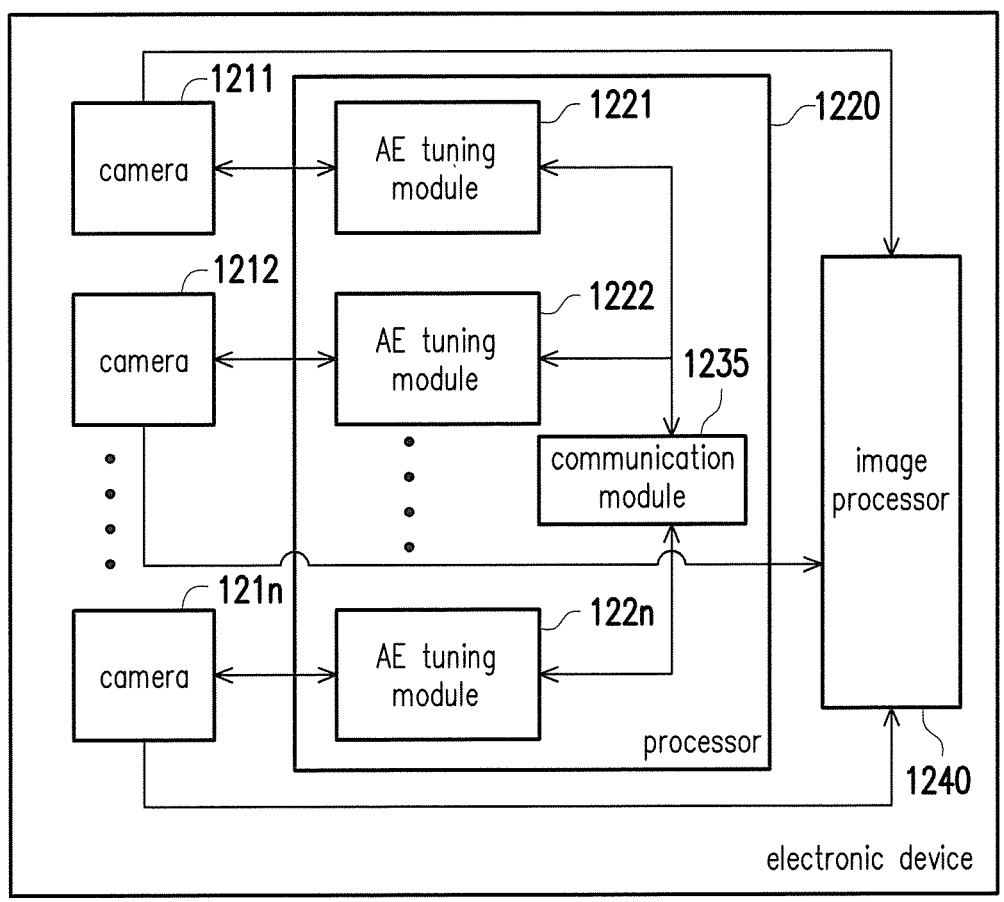
FIG. 12 illustrates a block diagram of an electronic device in accordance with one of the exemplary embodiments of the disclosure.

Referring to FIG. 12, an electronic device 1200 would include cameras 1211-121n a processor 1220, and an image processor 1240 that are respectively similar to the first cameras 1011 and the second cameras 1012, the processor 1020, and the image processor 1040 in FIG. 10. For the sake of brevity, the similarities would not be repeated. In the present exemplary embodiment, the processor 1220 would be configured to control the operation of each component of the electronic device 1200 and include AE tuning module 1221-122n corresponding to the cameras 1211-121n and a communication module 1235. In the master-slave architecture, one of the cameras 1211-121n would be set as a master camera, and the others would be set as slave cameras. Thus, the communication module 1235 would set joint exposure information based on exposure analysis information of the master camera. In the joint-decision architecture, the communication module 1235 would set joint exposure information based on all exposure analysis information of the cameras 1211-121n. The control method of the electronic device 1200 could be deduced by persons skilled in the art according to the related descriptions of FIG. 10-FIG. 11 and thus would not be repeated.

Figure 13:
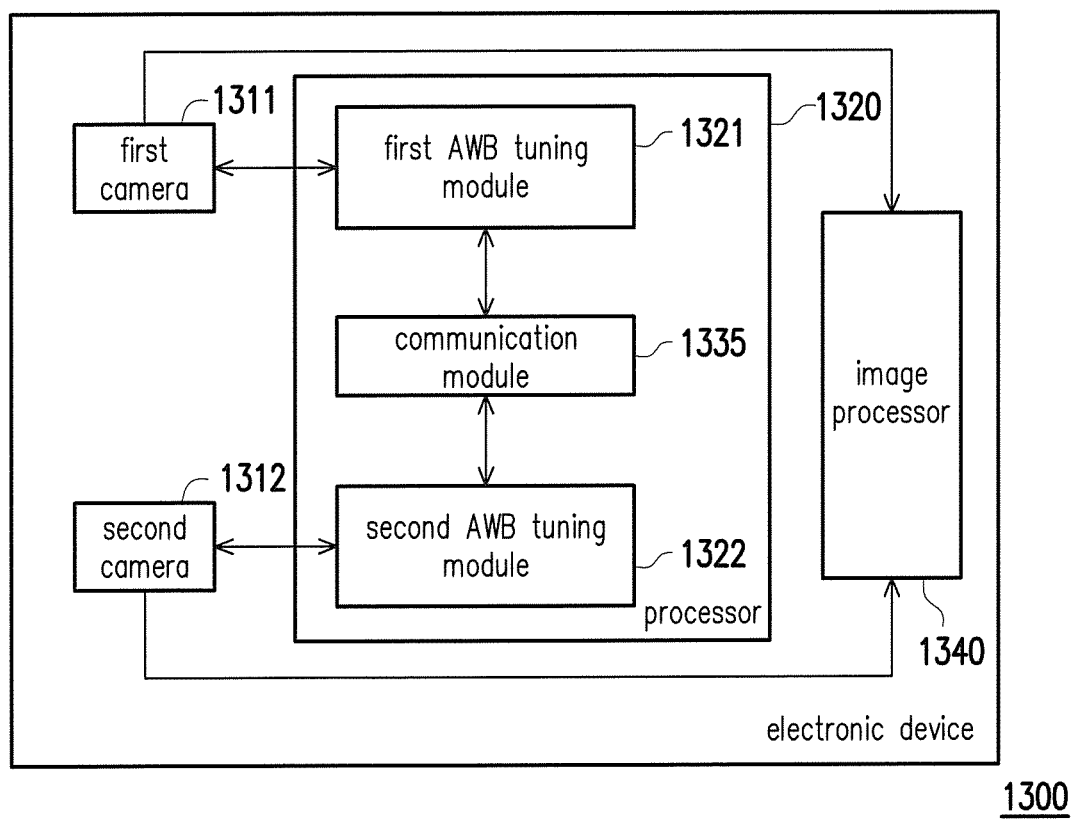
FIG. 13 illustrates a block diagram of an electronic device in accordance with one of the exemplary embodiments of the disclosure.

FIG. 13 illustrates a block diagram of an electronic device in accordance with one of the exemplary embodiments of the disclosure.

Referring to FIG. 13, an electronic device 1300 would include a first camera 1311, a second camera 1312, a processor 1320, and an image processor 1340 that are respectively similar to the first cameras 611 and the second cameras 612, the processor 620, and the image processor 640 in FIG. 6. For the sake of brevity, the similarities would not be repeated. In the present exemplary embodiment, the processor 1320 is configured to control the operation of each component of the electronic device 1300 and includes a first AWB tuning module 1321 corresponding to the first camera 1311, a second AWB tuning module 1322 corresponding to the second camera 1312, and a communication module 1335.

White balance control of the first camera 1311 and the second camera 1312 of the electronic device 1300 based on the master-slave architecture as well as the joint-decision architecture would be illustrated hereafter.

Similar to the exemplary embodiments of FIG. 10 and FIG. 11, due to different view angles of the first camera 1311 and the second camera 1312, image frames captured by the two cameras would have different color temperatures which would result in different white balances. In the proposed exposure mechanism based on the master-slave architecture, the first AWB tuning module 1021 would obtain white balance analysis information of the scene of the first camera 1311 by leveraging any AWB mechanism and set it as first white balance analysis information. Herein, the first white balance analysis information includes a color temperature and a color gain value (referred to as "a first color temperature" and "a first color gain value" hereafter) which are the individual photographing parameter of the first camera 1311. The communication module 1335 would set the first white balance analysis information as joint white balance information and transmit it to the second AWB tuning module 1322, and the second AWB tuning module 1322 would adjust a color temperature and a color gain value of the second camera 1312 (referred to as "second white balance information" which includes "a second color temperature" and "a second color gain value") according to the joint white balance information.

For example, the second AWB tuning module 1322 could set the second color temperature to the first color temperature. Moreover, since there might exist differences in color sensitivity between the first camera 1311 and the second camera 1312, the second AWB tuning module 1322 would adjust the second color gain value of the second camera 1312 according to a pre-stored color gain ratio between the first camera 1311 and the second camera 1312 as well as the first color gain value. That is, the second AE tuning module 1322 would set the adjusted second color temperature and the adjusted second color gain value as the individual photographing parameter of the second camera 1312. On the other hand, the first AWB tuning module 1321 would set the first color temperature and the second color gain value as the individual white balance parameter (i.e. individual photographing parameter) of the first camera 1311. Accordingly, the images captured by the first camera 1311 and the second camera 1312 would have the same white balance. Similarly, before the first camera 1311 and the second camera 1312 are assembled into the electronic device 1300, the color gain ratio could be calculated based on image color parameters captured by the first camera 1011 and the second camera 1012 with the same color temperature and could be pre-stored in the data storage device. In the present exemplary embodiment, the individual white balance parameter of the second camera 1312 would be determined by the second AWB tuning module 1322 according to the joint white balance information and the pre-stored calibration or the color gain ratio. Yet in another exemplary embodiment, the individual white balance parameter of the second camera 1312 could also be determined by the communication module 1335 according to the joint white balance information and the pre-stored calibration parameter or the color gain ratio and then transmitted to the second camera 1312.

In the proposed white balance mechanism based on the joint-decision architecture, to ensure that the first camera 1311 and the second camera 1312 are able to capture images with same objects, the communication module 1335 would determine a joint color temperature according to the first color temperature and the second color temperature of the first camera 1311 and the second camera 1312 so that their color temperatures could be adjusted to the same. Moreover, since there might exist differences in color sensitivity between the first camera 1311 and the second camera 1312, the first AWB tuning module 1321 and the second AWB tuning module 1322 would adjust their own color gain values according to a color gain ratio between the first camera 1311 and the second camera 1312. The first AWB tuning module 1321 and the second AWB tuning module 1322 would set the individual white balance parameters of the first camera 1311 and the second camera 1312 according to the color temperatures and the color gain values before and after the adjustment so that the images captured by the first camera 1311 and the second camera 1312 would have the same white balance.

The exemplary embodiment of FIG. 13 could be extended to an electronic device having three or more cameras. In detail, FIG. 14 illustrates a block diagram of an electronic device in accordance with one of the exemplary embodiments of the disclosure.

Figure 14:
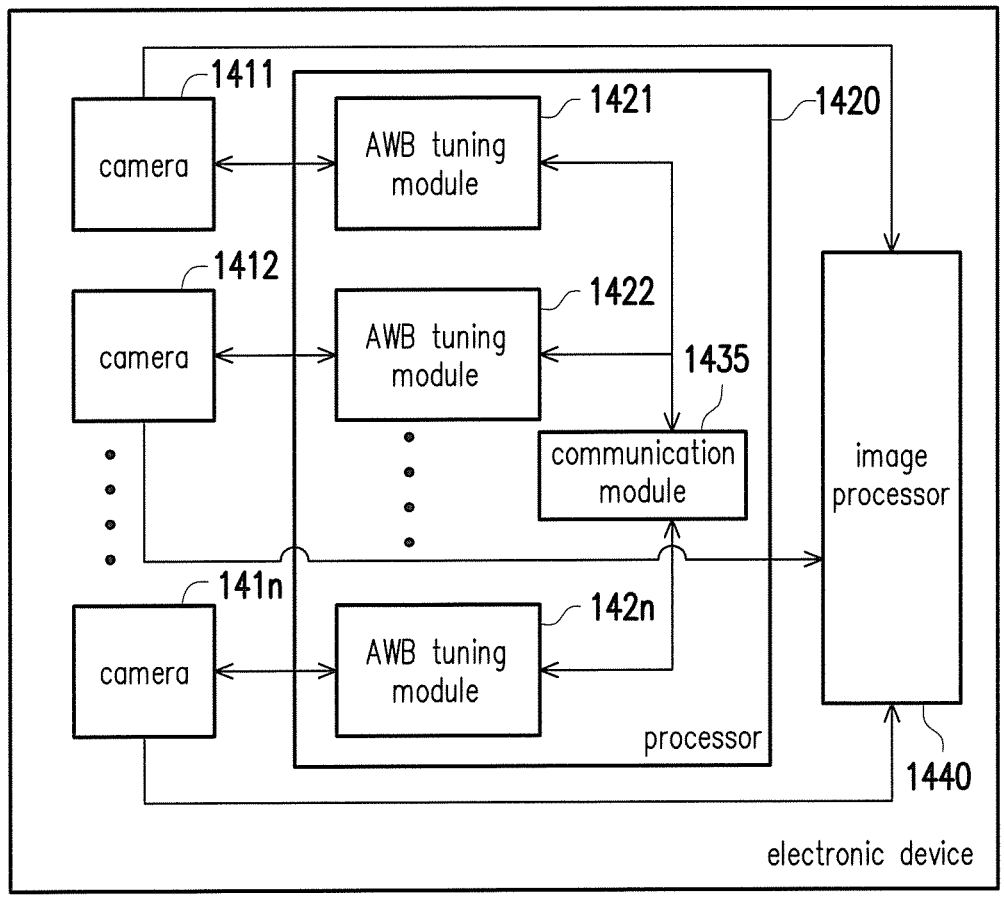
FIG. 14 illustrates a block diagram of an electronic device in accordance with one of the exemplary embodiments of the disclosure.

Referring to FIG. 14, an electronic device 1400 would include cameras 1411-141n, a processor 1420, and an image processor 1440 that are respectively similar to the first cameras 1311 and the second cameras 1312, the processor 1320, and the image processor 1340 in FIG. 13. For the sake of brevity, the similarities would not be repeated. In the present exemplary embodiment, the processor 1420 would be configured to control the operation of each component of the electronic device 1400 and include AWB tuning module 1421-142n corresponding to the cameras 1411-141n and a communication module 1435. In the master-slave architecture, one of the cameras 1411-141n would be set as a master camera, and the others would be set as slave cameras. Thus, the communication module 1435 would set joint white balance information based on white balance analysis information of the master camera. In the joint-decision architecture, the communication module 1435 would set joint white balance information based on all white balance analysis information of the cameras 1411-141n. The control method of the electronic device 1400 could be deduced by persons skilled in the art according to the related descriptions of FIG. 13 and thus would not be repeated.

The aforementioned embodiments could be integrated into a single electronic device. That is, such electronic device would be able to control its cameras to perform image capturing according to focus analysis information, exposure analysis information, and white balance analysis information (i.e. 3A photographing parameters). In detail, FIG. 15 illustrates a block diagram of an electronic device in accordance with one of the exemplary embodiments of the disclosure.

Figure 15:
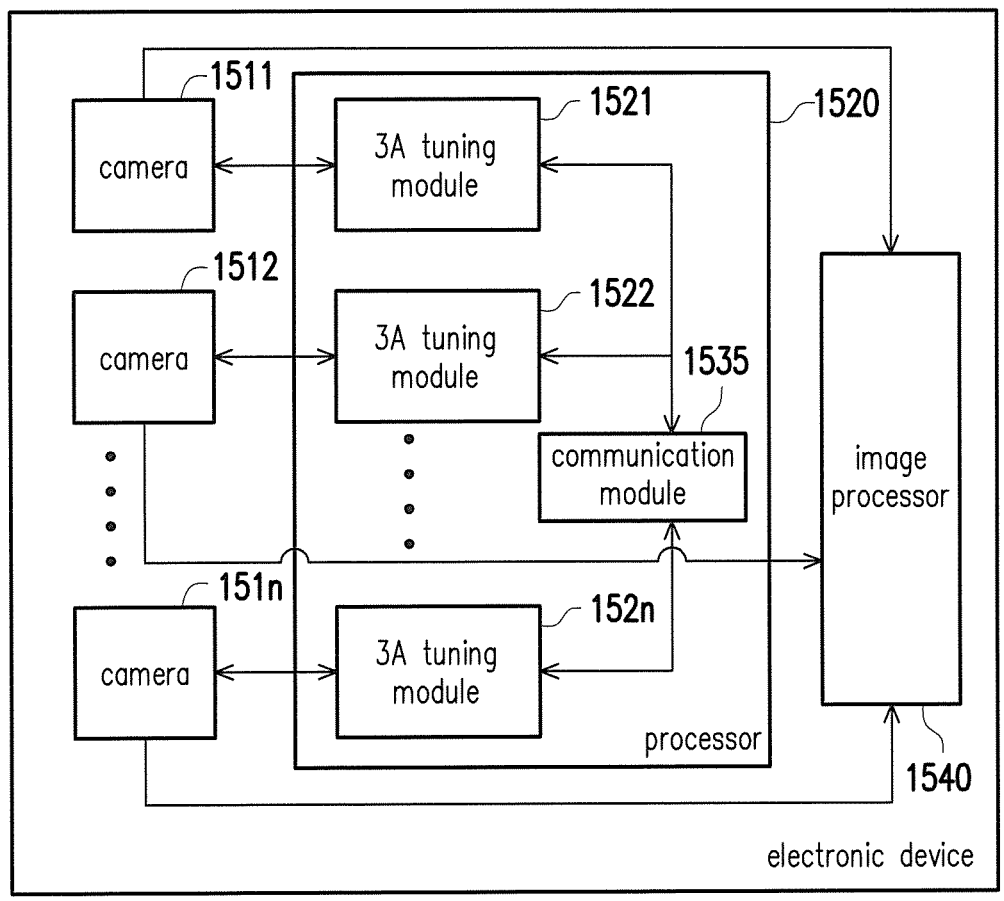
FIG. 15 illustrates a block diagram of an electronic device in accordance with one of the exemplary embodiments of the disclosure.

Referring to FIG. 15, an electronic device 1500 would include cameras 1511-151n, a processor 1520, and an image processor 1540. In the present exemplary embodiment, the processor 1520 wold be configured to control the operation of each component of the electronic device 1500 and include 3A parameter tuning module 1521-152n corresponding to the cameras 1511-151n and a communication module 1535. In the master-slave architecture, one of the cameras 1511-151n would be set as a master camera, and the others would be set as slave cameras. Thus, the communication module 1535 would set joint focus information, joint exposure information, and joint white balance information based on focus analysis information, exposure analysis information, and white balance analysis information of the master camera. In the joint-decision architecture, the communication module 1535 would set joint focus information, joint exposure information, joint white balance information based on all focus analysis information, exposure analysis information, and white balance analysis information of the cameras 1511-151n. The control method of the electronic device 1500 could be deduced by persons skilled in the art according to the related descriptions of the aforesaid embodiments and thus would not be repeated.

In summary, in the proposed multi-camera electronic device and its control method, before the electronic device performs image capturing on a particular scene, a communication process would be performed among all the cameras to generate joint photographing information of the scene, and all the cameras would capture images of the scene according to their individual photographing parameters generated based on the joint photographing information. The error of any follow-up image processing procedure could be thus minimized, and the effectiveness of follow-up application such as depth estimation, image fusion, distance measurement, digital zooming, stereo vision would be greatly enhanced.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of controlling an electronic device having a plurality of cameras, wherein the method comprises the following steps:
    detecting a scene by using at least one of the cameras to generate photographing analysis information, wherein the photographing analysis information is associated with auto-exposure, wherein the cameras comprise a first camera and at least one second camera, wherein the first camera detects the scene to generate first photographing analysis information, wherein the at least one second camera detects the scene to generate second photographing analysis information, and wherein the first photographing analysis information comprises a first exposure time and a first luminance gain value;
    collecting all the photographing analysis information and generating joint photographing information comprising a joint target through a communication process among all the cameras;
    generating an individual photographing parameter of each of the cameras according to the joint photographing information comprising:
        setting a second exposure time of the second photographing analysis information according to the first exposure time and a calibration parameter pre-stored in the second camera;
        setting a second luminance gain value of the second photographing analysis information according to the first luminance gain value and a luminance gain ratio between the second camera and the first camera, wherein the luminance gain ratio is pre-stored in the second camera; and
        setting the second exposure time and the second luminance gain value as the individual photographing parameter of the corresponding second camera; and
    controlling each of the cameras to capture an image of the scene by using the respective individual photographing parameter so as to generate a corresponding output image.

2. The method according to claim 1, wherein the step of collecting all the photographing analysis information and generating the joint photographing information comprising the joint target through the communication process among all the cameras comprises:
    obtaining an optimal photographing target according to the first photographing analysis information;
    setting the optimal photographing target as the joint target;
    setting information comprising the first photographing analysis information and the optimal photographing target as the joint photographing information.

3. The method according to claim 1, wherein the step of collecting all the photographing analysis information and generating the joint photographing information comprising the joint target through the communication process among all the cameras comprises:
    integrating the photographing analysis information generated from detecting the scene by using each of the cameras to generate the joint photographing information.

4. An electronic device comprising:
    a plurality of cameras, wherein the cameras comprise a first camera and at least one second camera;
    a processor, coupled to each of the cameras and comprising a plurality of modules, wherein the modules comprise:
        a plurality of photographing parameter tuning module, respectively corresponding to the cameras, wherein the photographing parameter modules comprise a first photographing parameter tuning module corresponding to the first camera and a second photographing parameter tuning module corresponding to the at least one second camera; and
        a communication module, wherein:
            at least one of the photographing parameter tuning module detects a scene by using at least one of the cameras to generate photographing analysis information, wherein the photographing analysis information is associated with auto-exposure, wherein the first photographing parameter tuning module detects the scene by using the first camera to generate first photographing analysis information, wherein the second photographing parameter tuning module detects the scene by using the at least one second camera to generate second photographing analysis information, and wherein the first photographing analysis information comprises a first exposure time and a first luminance gain value;
            the communication module collects all the photographing analysis information and generates joint photographing information comprising a joint target through a communication process among all the cameras; and each of the photographing parameter tuning modules generates an individual photographing parameter of the corresponding camera according to the joint photographing information and controls the corresponding to capture an image of the scene by using the respective individual photographing parameter so as to generate a corresponding output image, wherein each of the at least one second photographing parameter tuning module sets a second exposure time of the second photographing analysis information according to the first exposure time and a calibration parameter pre-stored in the second camera, sets a second luminance gain value of the second photographing analysis information according to the first luminance gain value and a luminance gain ratio between the second camera and the first camera, and sets the second exposure time and the second luminance gain value as the individual photographing parameter of the corresponding second camera, wherein the luminance gain ratio is pre-stored in the second camera; and an image processor, coupled to each of the cameras and receiving the output images from the cameras.

5. The electronic device according to claim 4, wherein the first photographing parameter tuning module obtains an optimal photographing target according to the first photographing analysis information, and wherein the communication module sets the optimal photographing target as the joint target and sets information comprising the first photographing analysis information and the optimal photographing target as the joint photographing information.

6. The electronic device according to claim 4, wherein the communication module integrates the photographing analysis information generated from detecting the scene by using each of the cameras to generate the joint photographing information.

7. A method of controlling an electronic device having a plurality of cameras, wherein the method comprises the following steps:

detecting a scene by using at least one of the cameras to generate photographing analysis information, wherein the photographing analysis information is associated with auto-white-balance wherein the cameras comprise a first camera and at least one second camera, wherein the first camera detects the scene to generate first photographing analysis information, wherein the at least one second camera detects the scene to generate second photographing analysis information, wherein the first photographing analysis information comprises a first color temperature and a first color gain value;

collecting all the photographing analysis information and generating joint photographing information comprising a joint target through a communication process among all the cameras;

generating an individual photographing parameter of each of the cameras according to the joint photographing information comprising:

setting a second color temperature of the second photographing analysis information according to the first color temperature;

setting a second color gain value of the second photographing analysis information according to the first color gain value and a color gain ratio between the second camera and the first camera, wherein the color gain ratio is pre-stored in the second camera; and setting the second color temperature and the second color gain value as the individual photographing parameter of the corresponding second camera; and controlling each of the cameras to capture an image of the scene by using the respective individual photographing parameter so as to generate a corresponding output image.

8. An electronic device comprising:

a plurality of cameras, wherein the cameras comprise a first camera and at least one second camera;

a processor, coupled to each of the cameras and comprising a plurality of modules, wherein the modules comprise:

a plurality of photographing parameter tuning module, respectively corresponding to the cameras, wherein the photographing parameter modules comprise a first photographing parameter tuning module corresponding to the first camera and a second photographing parameter tuning module corresponding to the at least one second camera; and a communication module, wherein:

at least one of the photographing parameter tuning module detects a scene by using at least one of the cameras to generate photographing analysis information, wherein the photographing analysis information is associated with auto-white-balance;

the communication module collects all the photographing analysis information and generates joint photographing information comprising a joint target through a communication process among all the cameras, wherein the first photographing parameter tuning module detects the scene by using the first camera to generate first photographing analysis information, wherein the second photographing parameter tuning module detects the scene by using the at least one second camera to generate second photographing analysis information, and wherein the first photographing analysis information comprises a first color temperature and a first color gain value; and each of the photographing parameter tuning modules generates an individual photographing parameter of the corresponding camera according to the joint photographing information and controls the corresponding to capture an image of the scene by using the respective individual photographing parameter so as to generate a corresponding output image, wherein each of the at least one photographing parameter tuning module sets a second color temperature of the second photographing analysis information according to the first color temperature, sets a second color gain value of the second photographing analysis information according to the first color gain value and a color gain ratio between the second camera and the first camera, and sets the second color temperature and the second color gain value as the individual photographing parameter of the corresponding second camera, wherein the color gain ratio is pre-stored in the second camera; and an image processor, coupled to each of the cameras and receiving the output images from the cameras.

* * * * *